United States Patent
Tsuchiya

(10) Patent No.: US 9,626,136 B2
(45) Date of Patent: Apr. 18, 2017

(54) IMAGE FORMING APPARATUS, IMAGE FORMING SYSTEM, AND NON-TRANSITORY STORAGE MEDIUM

(75) Inventor: Taisuke Tsuchiya, Toyota (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/599,487

(22) Filed: Aug. 30, 2012

(65) Prior Publication Data

US 2013/0050759 A1 Feb. 28, 2013

(30) Foreign Application Priority Data

Aug. 31, 2011 (JP) ................................. 2011-189570

(51) Int. Cl.
*G06F 3/12* (2006.01)
*G06K 15/00* (2006.01)
(Continued)

(52) U.S. Cl.
CPC .......... *G06F 3/1238* (2013.01); *G06F 1/3284* (2013.01); *G06F 3/1221* (2013.01);
(Continued)

(58) Field of Classification Search
CPC ........................ G06K 15/02; G06K 15/1806
(Continued)

(56) References Cited

U.S. PATENT DOCUMENTS 5,657,257 A * 8/1997 Lee ........................... G06F 1/26
   713/321
5,956,471 A * 9/1999 Ueda ...................... G06F 21/31
   340/10.6
(Continued)

FOREIGN PATENT DOCUMENTS

CN 1619456 A 5/2005
CN 1657301 A 8/2005
(Continued)

OTHER PUBLICATIONS

Office Action issued in related Japanese Patent Application No. 2011-189570, mailed Feb. 17, 2015.
(Continued)

*Primary Examiner* — Akwasi M Sarpong
(74) *Attorney, Agent, or Firm* — Merchant & Gould P.C.

(57) ABSTRACT

An image forming apparatus comprising: a receiver for receiving a print job; a printing unit; a storage unit; an input interface for receiving a print execution command from a user; a power source for supplying an electric power; and a controller configured to: control the power source to stop or reduce the power supply to the printing unit when the receiver has not received a next print job within an after-printing standby time from completion of the printing; and control the power source to stop or reduce the power supply to the printing unit when the print job is a print-execution-command-input required print job requiring the print execution command and the receiver has not received a next print job within an after-print-job-receipt standby time from the receipt of the print-execution-command-input required print job, the after-print-job-receipt standby time being longer than the after-printing standby time.

2 Claims, 13 Drawing Sheets

(51) Int. Cl.
*H04N 1/00* (2006.01)
*H04N 1/60* (2006.01)
*B41C 1/02* (2006.01)
*G06F 1/32* (2006.01)

(52) U.S. Cl.
CPC .......... *G06F 3/1267* (2013.01); *G06F 3/1285* (2013.01); *G06K 15/4055* (2013.01); *Y02B 60/1267* (2013.01); *Y02B 60/1271* (2013.01); *Y02B 60/32* (2013.01)

(58) Field of Classification Search
USPC ............ 358/1.14, 1.15, 1.13, 1.16; 340/10.6, 340/574, 5.52; 713/321, 323; 386/248, 386/231
See application file for complete search history.

(56) References Cited

U.S. PATENT DOCUMENTS

| | | | | |
|---|---|---|---|---|
| 7,719,708 B2* | 5/2010 | Ferlitsch | .............. | G06F 21/608 358/1.14 |
| 7,796,281 B2* | 9/2010 | Tsuzuki | ................ | G06F 3/1204 358/1.14 |
| 8,269,995 B2* | 9/2012 | Niitsuma | .............. | G06F 21/608 340/5.52 |
| 2002/0149789 A1* | 10/2002 | Okazawa | .............. | G06F 1/3215 358/1.14 |
| 2005/0100378 A1* | 5/2005 | Kimura | ........................... | 400/76 |
| 2005/0180769 A1 | 8/2005 | Morioka | | |
| 2006/0010331 A1 | 1/2006 | Ohara | | |
| 2006/0127054 A1* | 6/2006 | Matsuyama | ....... | H04N 1/00405 386/248 |
| 2008/0158574 A1* | 7/2008 | Sugiyama | .......... | H04N 1/00885 358/1.1 |
| 2008/0198402 A1 | 8/2008 | Azuma et al. | | |
| 2008/0297837 A1* | 12/2008 | Soda | .................... | G06K 15/005 358/1.15 |
| 2010/0007904 A1* | 1/2010 | Eto | .................... | G03G 15/5004 358/1.13 |
| 2010/0020344 A1 | 1/2010 | Ohtani | | |

FOREIGN PATENT DOCUMENTS

| | | |
|---|---|---|
| CN | 1719384 A | 1/2006 |
| CN | 101212539 A | 7/2008 |
| CN | 101634821 A | 1/2010 |
| JP | H07-152520 A | 6/1995 |
| JP | H08-150764 A | 6/1996 |
| JP | 2002-027159 A | 1/2002 |
| JP | 2008-300914 A | 12/2008 |
| JP | 2010-194884 A | 9/2010 |

OTHER PUBLICATIONS

Office Action issued in related Chinese Patent Application No. 201210319788.3, mailed Jul. 26, 2014.

* cited by examiner

IMAGE FORMING APPARATUS, IMAGE FORMING SYSTEM, AND NON-TRANSITORY STORAGE MEDIUM

CROSS REFERENCE TO RELATED APPLICATION

The present application claims priority from Japanese Patent Application No. 2011-189570, which was filed on Aug. 31, 2011, the disclosure of which is herein incorporated by reference in its entirety.

BACKGROUND OF THE INVENTION

Field of the Invention

The present invention relates to an image forming apparatus, an image forming system, and a non-transitory storage medium for forming an image on a recording medium based on image data transmitted from a data processor such as a personal computer.

Description of the Related Art

There is conventionally known an image forming apparatus such as a printer and a facsimile machine communicably connected to a data processor such as a personal computer and configured to print an image and/or texts on a recording medium based on image data transmitted from the data processor. Such an image forming apparatus does not perform the printing immediately for the image data transmitted from the data processor to the image forming apparatus, and a user commands the printing at the image forming apparatus to perform the printing (noted that this printing is called a storage print because the print data is temporarily stored). One example of the image forming apparatus is one having an identification printing function. This identification printing function is a function in which a user permitted to perform the printing and having made the print request performs an identification operation at the image forming apparatus in order for the image forming apparatus to identify the print job, and, if the identification operation has succeeded, the printing of the print job is allowed. Specifically, the user requests the printing at the data processor by entering authentication information (e.g., an ID and a password). The image forming apparatus detects that the print request contains the authentication information and registers the print request as a print job with the authentication information (which is called an authentication print job). The user having made the print request enters the authentication information at the image forming apparatus. If the entered authentication information is correct, the image forming apparatus allows the printing of the authentication print job. This identification printing function is mainly used when confidential documents are printed, for example.

Another example of the image forming apparatus is one configured such that the image data transmitted from the data processor to the image forming apparatus is stored into the image forming apparatus, and the printing is performed by the user commanding the printing at the image forming apparatus for the image data. This apparatus does not have the identification function, but a plurality of users can print the image data stored in the image forming apparatus on demand.

If the image forming apparatus is always kept in a standby state in which a power source of the apparatus is ON such that the printing can be started immediately, an electric power for the standby state is consumed even when the printing is not performed. In order to save the power consumption, if a next print job has not been received within a predetermined standby time, or the image forming apparatus has not been operated by the user within the predetermined standby time, the image forming apparatus enters a power saving mode (hereinafter may be referred to as "sleep mode") after a lapse of the standby time. The power saving mode is a mode in which the supply of the power to some circuits or the apparatus is stopped or reduced. With increasing demand for a power-saving image forming apparatus, there has been developed an apparatus in which the apparatus enters the sleep mode even if the image forming apparatus is not operated within a short length of time, e.g., 15 seconds. This sleep mode is exited when the next print job arrives, or the user performs an appropriate operation on the image forming apparatus.

SUMMARY OF THE INVENTION

In the above-described image forming apparatus, when the next print job has not been received within the predetermined standby time, the sleep mode is entered if the image forming apparatus has not been operated by the user. That is, the sleep mode is entered when the operation of the user such as the input of the authentication information as described above has not been performed. However, in the printing using the storage print function, in general, in a case where a length of time elapsed from the transmission of the print request from, e.g., the data processor to the image forming apparatus, to the input of the print command into the image forming apparatus is short, and the image forming apparatus is in the sleep mode, the user has to wait at the image forming apparatus. For example, in the printing using the identification printing function, if it takes a relatively long time for the user to move from the data processor to the image forming apparatus, the sleep mode is entered, and the user having made the print request with the authentication information unfortunately waits until the sleep mode is exited. In contrast, if a length of time to the entering of the sleep mode is relatively long, the user does not need to wait at the image forming apparatus, but a power saving effect is low. It is noted that, in the case of the storage print not using the identification printing function, the user having stored the print job into the image forming apparatus is highly likely to perform the printing immediately after the storage of the print job, and thus a situation is the same as the above-described situation.

This invention has been developed to provide an image forming apparatus, an image forming system, and a non-transitory storage medium capable of, while maintaining a power saving effect, solving a problem in which a user having made a print request using a storage print function waits for an exit of a sleep mode.

The present invention provides an image forming apparatus comprising: a receiver configured to receive a print job transmitted from an external device; a printing unit configured to print an image on a print medium based on the print job; a storage unit configured to store one of the print job and image data associated with the print job; an input interface configured to receive a print execution command for commanding an execution of the printing of the print job stored in the storage unit; a power source configured to supply an electric power to at least the printing unit; and a controller configured to: judge whether the print job received by the receiver is a print-execution-command-input required print job based on which the printing unit performs printing on condition that the print execution command is inputted into the input interface or a print-execution-command-input unrequired print job based on which the printing unit performs printing without waiting for the input of the print execution command into the input interface; control the power source to stop or reduce the supply of the electric power to the printing unit when the receiver has not received a next print job within an after-printing standby time elapsed from completion of the printing by the printing unit for the print job received by the receiver; and control the power source to stop or reduce the supply of the electric power to the printing unit when the print job received by the receiver is the print-execution-command-input required print job and the receiver has not received a next print job within an after-print-job-receipt standby time elapsed from a time of the receipt of the print-execution-command-input required print job by the receiver, the after-print-job-receipt standby time being longer than the after-printing standby time.

The present invention provides an image forming system comprising a data processor and an image forming apparatus configured to receive a print job transmitted from the data processor, the image forming apparatus comprising: a receiver configured to receive the print job transmitted from an external device; a printing unit configured to print an image on a print medium based on the print job; a storage unit configured to store one of the print job and image data associated with the print job; an input interface into which the user inputs a print execution command for printing the print job; a power source configured to supply an electric power to at least the printing unit; and a controller configured to: judge whether the print job received by the receiver is a print-execution-command-input required print job based on which the printing unit performs printing on condition that the print execution command is inputted into the input interface or a print-execution-command-input unrequired print job based on which the printing unit performs printing without waiting for the input of the print execution command into the input interface; control the power source to stop or reduce the supply of the electric power to the printing unit when the receiver has not received a next print job within an after-printing standby time elapsed from completion of the printing by the printing unit for the print job received by the receiver; and control the power source to stop or reduce the supply of the electric power to the printing unit when the print job received by the receiver is the print-execution-command-input required print job and the receiver has not received a next print job within an after-print-job-receipt standby time elapsed from a time of the receipt of the print job by the receiver, the after-print-job-receipt standby time being longer than the after-printing standby time.

The present invention provides a non-transitory storage medium storing a program executed by a computer of an image forming apparatus, the image forming apparatus comprising: a receiver configured to receive a print job transmitted from an external device; a printing unit configured to print an image on a print medium based on the print job; a storage unit configured to store one of the print job and image data associated with the print job; an input interface into which the user inputs a print execution command for printing the print job; and a power source configured to supply an electric power to at least the printing unit, the program being designed to have the computer function to: judge whether the print job received by the receiver is a print-execution-command-input required print job based on which the printing unit performs printing on condition that the print execution command is inputted into the input interface or a print-execution-command-input unrequired print job based on which the printing unit performs printing without waiting for the input of the print execution command into the input interface; control the power source to stop or reduce the supply of the electric power to the printing unit when the receiver has not received a next print job within an after-printing standby time elapsed from completion of the printing by the printing unit for the print job received by the receiver; and control the power source to stop or reduce the supply of the electric power to the printing unit when the print job received by the receiver is the print-execution-command-input required print job and the receiver has not received a next print job within an after-print-job-receipt standby time elapsed from a time of the receipt of the print job by the receiver, the after-print-job-receipt standby time being longer than the after-printing standby time.

The present invention provides an image forming system comprising: a data processor; a server device capable of receiving a print command and print data transmitted from the data processor; an image forming apparatus capable of receiving the print command and the print data transferred from the server device, wherein the server device comprises: a server-side receiver configured to receive the print command and the print data transmitted from the data processor; a transfer unit configured to transfer, to the image forming apparatus, at least one of the print command and the print data received by the server-side receiver; a server-side storage unit configured to store at least the print data; a transfer-request receiver configured to receive a transfer request of the print data transmitted from the image forming apparatus; a server-side controller configured to: judge whether the print data received by the server-side receiver is transfer-request required print data for transferring the print data to the image forming apparatus when the transfer request is transmitted from the image forming apparatus or transfer-request unrequired print data for transferring the print data to the image forming apparatus without waiting for the transfer request transmitted from the image forming apparatus; control the transfer unit to transfer the print command and the print data to the image forming apparatus when the print data received by the server-side receiver is the transfer-request unrequired print data; when the print data received by the server-side receiver is the transfer-request required print data, control the transfer unit to transfer the print command to the image forming apparatus and control the server-side storage unit to store the print data into the server-side storage unit; and thereafter control the transfer unit to transfer the print data to the image forming apparatus when the transfer-request receiver receives a transfer request for the print data stored in the server-side storage unit, and wherein the image forming apparatus comprises: a receiver configured to receive the print command and the print data transferred from the server device; a transmitter configured to transmit the transfer request to the server device; a printing unit configured to print an image on a print medium based on the print data; a storage unit configured to store the print command; an input interface configured to receive a print execution command for commanding an execution of the print command stored in the storage unit; a power source configured to supply an electric power to at least the printing unit; and a controller configured to: when the receiver receives the print command and the print data, control the printing unit to print the image on the print medium based on the print data without waiting for the input of the print execution command into the input interface; when the print command is received without the receipt of the print data by the receiver, store the received print command into the storage unit, control the transmitter to request the server device to transfer the print data corresponding to the print command when the print execution command for executing the print command stored in the storage unit is inputted into the input interface, and control the printing unit to print the image based on the print data after the receiver receives the print data transferred from the transfer unit in response to the transfer request; and control the power source to stop or reduce the supply of the electric power to the printing unit when the receiver has not received a next print command within an after-printing standby time elapsed from completion of the printing by the printing unit for the print data received by the receiver, and control the power source to stop or reduce the supply of the electric power to the printing unit when the receiver has not received a next print command within an after-print-command-receipt standby time elapsed from a time of the receipt of the print command by the receiver, the after-print-command-receipt standby time being longer than the after-printing standby time.

In the configurations described above, it is possible to, while maintaining a power saving effect, solve a problem in which a user having made a print request using a storage print function waits for an exit of a sleep mode.

The present invention is effective for the image forming apparatus having the sleep mode, the image forming system using the image forming apparatus, and a program for forming the image.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DETAILED DESCRIPTION OF THE EMBODIMENTS

Figure 1:
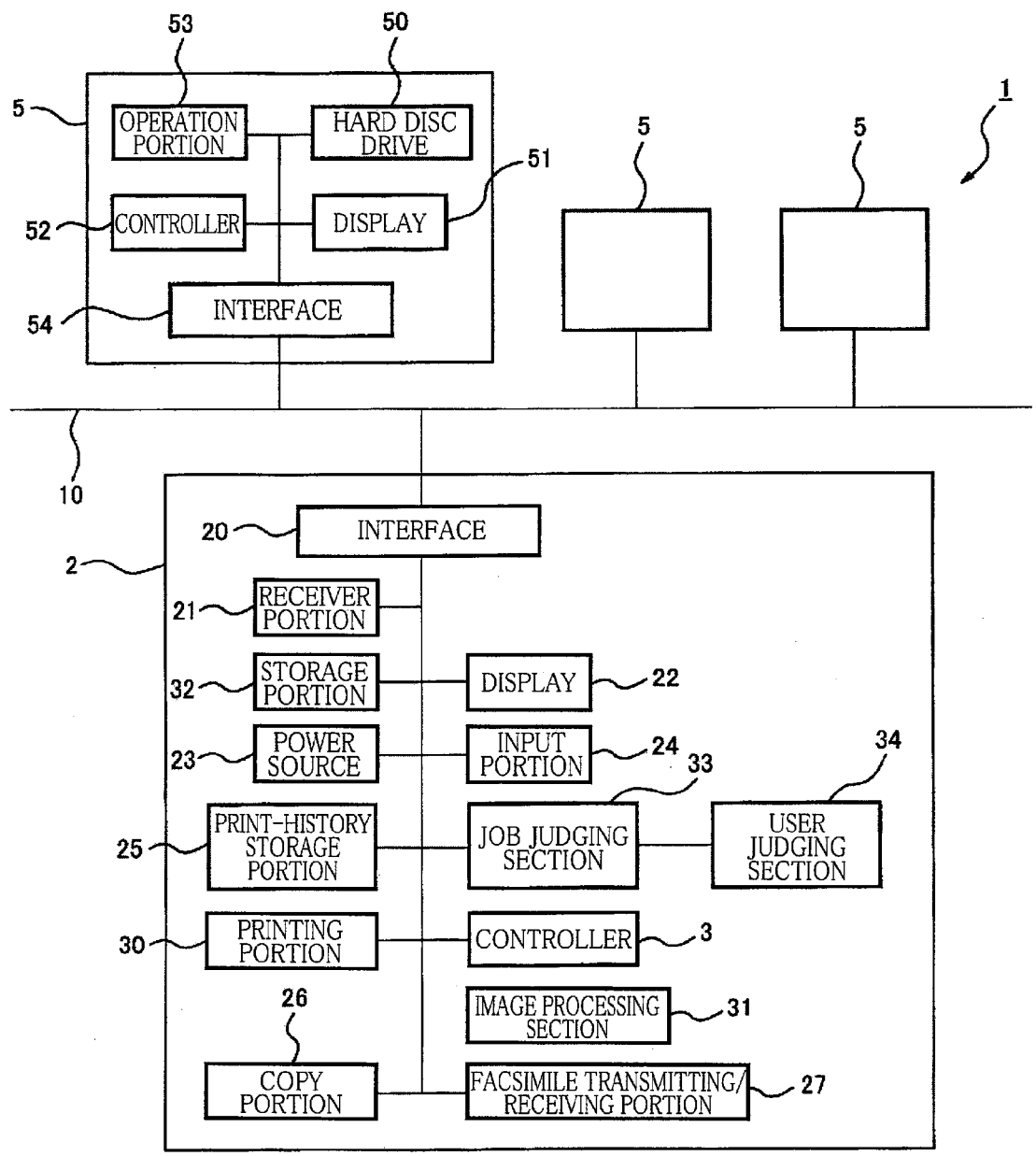
FIG. 1 is a block diagram showing a configuration of an image forming system including an image forming apparatus and data processors.

Hereinafter, there will be described embodiments of the present invention by reference to the drawings. As shown in FIG. 1, an image forming system 1 includes an image forming apparatus 2 and a plurality of data processors 5. The image forming apparatus 2 is connected to the data processors 5 via a network 10 such as an internet and a LAN. That is, the image forming system 1 is configured on the assumption that a plurality of users of the data processors 5 share the image forming apparatus 2. The network 10 may be any of a wired network and a wireless network. Each of the data processors 5, for example, is a personal computer including: a hard disc drive 50 storing an operating system (OS) and application software for creating text data and image data for printing; a display 51 for displaying the image data; a controller 52 for controlling overall operations of the data processor 5 by calling up programs from the hard disc drive 50; an operation portion 53 having a keyboard and a touch panel; and an interface 54 connected to the network 10.

The image forming apparatus 2 is what is called a multifunction printer including: a copy portion 26 which is operated by the user at the image forming apparatus 2 for copying documents; and a facsimile transmitting/receiving portion 27. The following description, however, focuses on a print function for printing texts and/or images based on a print job received from the data processor 5.

The print function of the image forming apparatus 2 as the present embodiments includes (i) public print, (ii) private print, (iii) secure print, and (iv) normal print (as one example of print-command-input unrequired print). Each of the public print, the private print, and the secure print is a print function in which, when the user makes a print request, the print job is temporarily stored into the image forming apparatus 2, and the printing is performed on confition that the user having made the print request inputs a print command at the image forming apparatus 2 into the apparatus 2 for the printing on a recording medium. The normal print is a print function in which, when the user makes the print request, the printing is performed immediately without the user having to input the print command into the image forming apparatus 2.

Specifically, the secure print is used when a confidential document such as a payment statement which is private to the user having made the print request is printed, for example. The secure print therefore requires a user identification that is an identification of the user having made the print request and an identification of the print job as the print command to be inputted into the image forming apparatus 2. The user identification, for example, is performed using a card reader, not shown, of the image forming apparatus 2 which is for reading a card of the user. The identification of the print job is performed by the user entering an identification code, specifically, a password into the image forming apparatus 2. When the printing is performed in the secure print, the user sets a password in transmission of the print request and enters the password at the image forming apparatus 2. When the entered password is the same as that set in the transmission of the print request, a printing portion 30 starts to perform the printing. On the other hand, when the entered password is not correct, the printing is not allowed.

Each of the public print and the private print does not require the identification of the print job but requires the user identification as the print command, that is, each of the public print and the private print has lower confidentiality than that of the secure print. Users permitted to perform printing are limited in the private print but are not limited in the public print. Specifically, in the public print, any user of the data processor 5 connected to the image forming apparatus 2 is permitted to perform the printing of the documents. It is noted that the copying and scanning may or may not require the user identification. In the following explanation, the user identification and the identification of the print job may be called authentication information. That is, the authentication information of the secure print is the user identification and the identification of the print job, and the authentication information of each of the public print and the private print is only the user identification.

In the following explanation, a print job for the secure print will be called an authentication print job, and a print job for three print functions other than the secure print will be called a non-authentication print job. Further, in the public print, the private print, and the secure print, the printing is performed on condition that the print command is inputted into the image forming apparatus 2, specifically, on condition that the user identification is performed. Thus, the print job for the public print, the private print, and the secure print is temporarily stored into a storage portion 32 which will be described below. Therefore, such a print job will be referred to as "storage print job" (as one example of a print-execution-command-input required print job), while a print job for the normal print which does not require the user identification will be referred to as "normal print job" (as one example of a print-execution-command-input unrequired print job). It is noted that the print job for the normal print is not stored into the storage portion 32. The authentication print job and the normal print job are automatically deleted from the image forming apparatus 2 after the jobs are printed. On the other hand, the print jobs for the public print and the private print among the non-authentication print jobs are not automatically deleted after the jobs are printed. When deleting the non-authentication print jobs remaining in the image forming apparatus 2 after the jobs are printed, the user needs to enter a command to delete the non-authentication print jobs.

As shown in FIG. 1, the image forming apparatus 2 includes: an interface 20 connected to the network 10; a receiver portion 21 configured to receive the print jobs transmitted from the data processors 5; a display 22 configured to display print information of the image forming apparatus 2, for example; an input portion 24 having a liquid crystal display on which the user performs input operations including inputs of the print command of the print job and deleting of the print job; the storage portion 32 constituted by a ROM, a RAM, and/or the like configured to store operation programs and the print jobs or image data contained in the print jobs, for example; a power source 23 configured to supply electric power selectively to one or more of components of the image forming apparatus 2; a print-history storage portion 25 configured to store a print history of each user; a job judging section 33 configured to judge whether the print job received by the receiver portion 21 is the storage print job or the normal print job; the printing portion 30 configured to perform a printing operation on the recording medium such as a paper sheet; a controller 3 (e.g., a CPU) configured to control at least the printing portion 30 and the power source 23; and an image processing section 31 configured to execute a RIP (Raster Image Processor) processing, i.e., RIP'ing, for turning the print job in a raster image format to produce raster data or a bitmap image. The controller 3 divides an operation clock (i.e., a clock frequency) into many regions to use them as a timer. The job judging section 33 includes a user judging section 34 configured to read identification information from the authentication print job if the print job is the authentication print job. If the print job is the storage print job, the job judging section 33 can also judge whether the print job is the authentication print job or the non-authentication print job, that is, the job judging section 33 can judge whether the print job is the print job for the public print or the print job for the private print.

Figure 2:
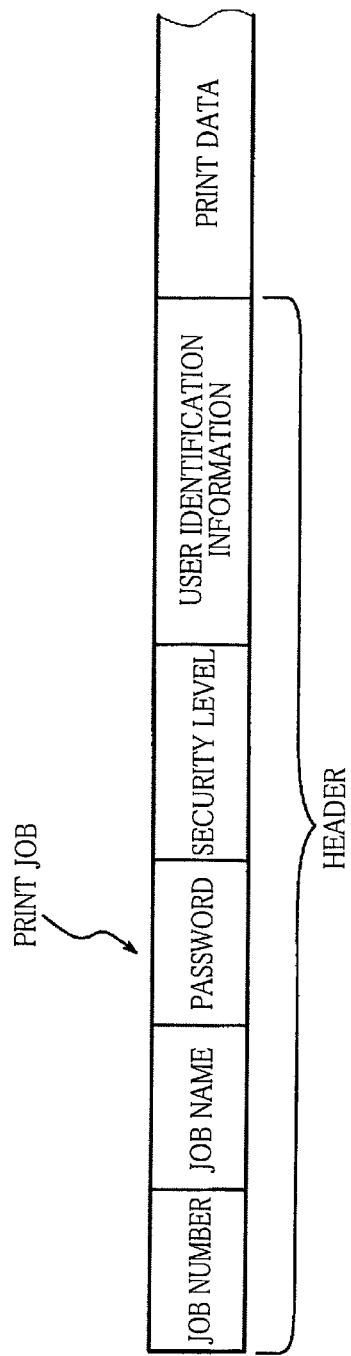
FIG. 2 is a view showing a format of a print job.

As shown in FIG. 2, the print job includes: a job number; a job name given by the user; the password set by the user if the print job is the authentication print job; a security level that is information indicating any of the public print, the private print, the secure print, and the normal print; user identification information; and print data (i.e., image data). If the print job is not the authentication print job, the password is set to null or zero. The job name, the password, and the security level are set by the user of the data processor 5. The job number, the job name, the password, the security level, and the user identification information of the print job are called a header of the print job.

The controller 3 has the timer function as described above. The controller 3 stores a value of a standby time (or a waiting time), and one or more of the components of the image forming apparatus 2 enter or initiates a sleep mode when the next print job has not received for a length of time corresponding to this value after the completion of the printing of the print job. This value corresponds to a length of time L2 (as one example of a print-command-input unrequired standby time). Further, the controller 3 stores another value of the standby time, and when the print command for printing the storage print job has not been inputted for a length of time corresponding to this value from the receipt of the storage print job, one or more of the components of the image forming apparatus 2 enter the sleep mode. This value corresponds to a length of time L1 (as one example of a print-command-input required standby time). The time L1 is longer than the time L2. When the printing of the print job by the printing portion 30 is completed, the controller 3 starts to measure time from a point in time when the printing of the print job is completed. Further, when the receiver portion 21 receives the storage print job, the controller 3 starts to measure time from a point in time when the storage print job is received. In a case where the receiver portion 21 has not received the print job within the time L2 from the start of the time measurement or in a case where the receiver portion 21 has received the print job, but the print job is the storage print job, and the user has not inputted the print command within the time L1, the controller 3 controls the image forming apparatus 2 to enter the sleep mode so as to stop or reduce the supply of the electric power to the printing portion 30, the storage portion 32, and the image processing section 31 after a lapse of the time L2 or the time L1. In this case, the supply of the electric power to the controller 3 and the receiver portion 21 is not stopped or reduced so that the controller 3 and the receiver portion 21 can receive the print job. This lowers power consumption of the image forming apparatus 2. It is noted that the values of the standby time may be stored in a low-capacity ROM included in the controller 3 or a portion of the storage portion 32.

First Embodiment

Figure 3:
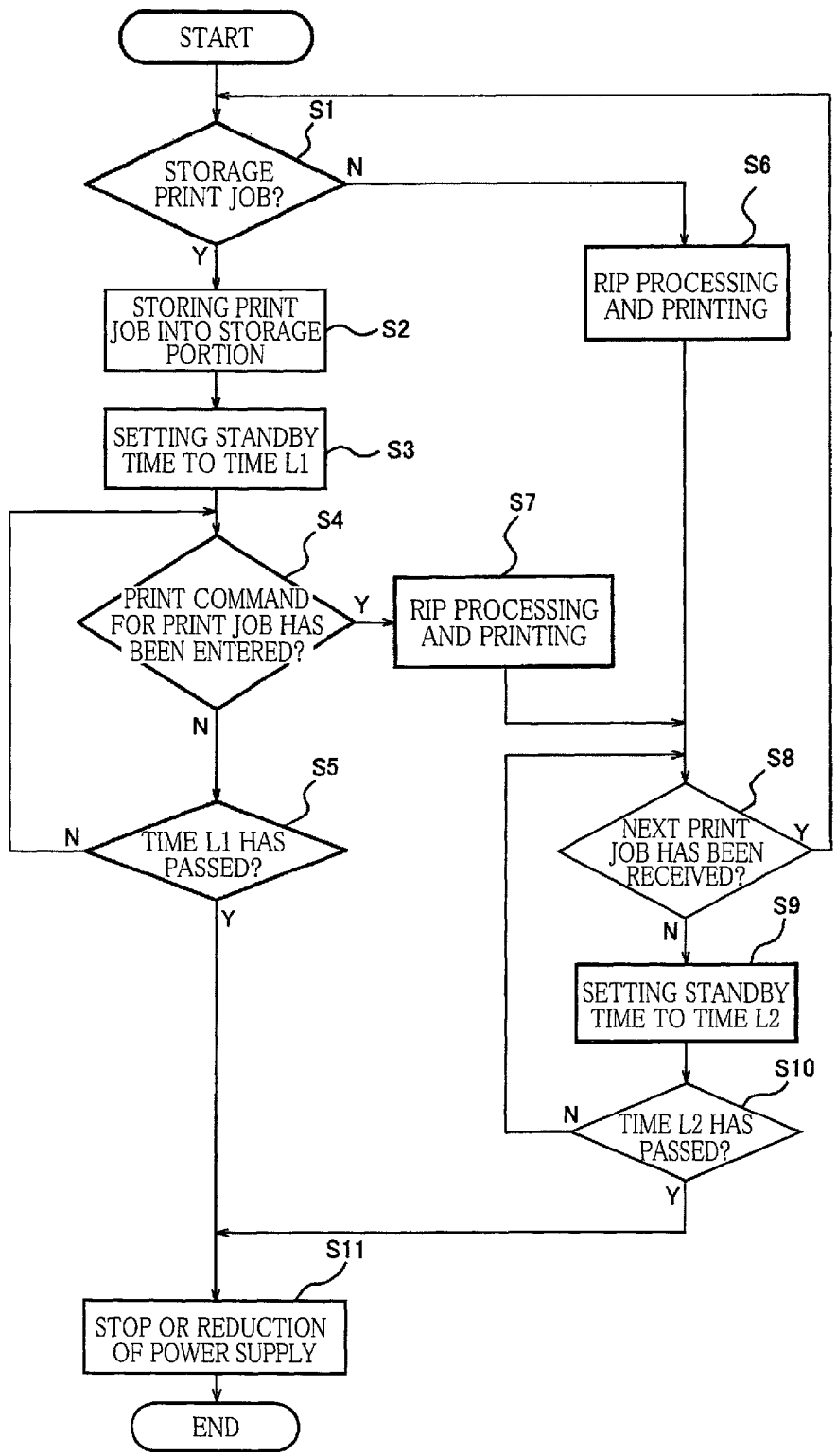
FIG. 3 is a flow chart showing a sleep-mode setting processing of the image forming apparatus as a first embodiment.
Figure 5:
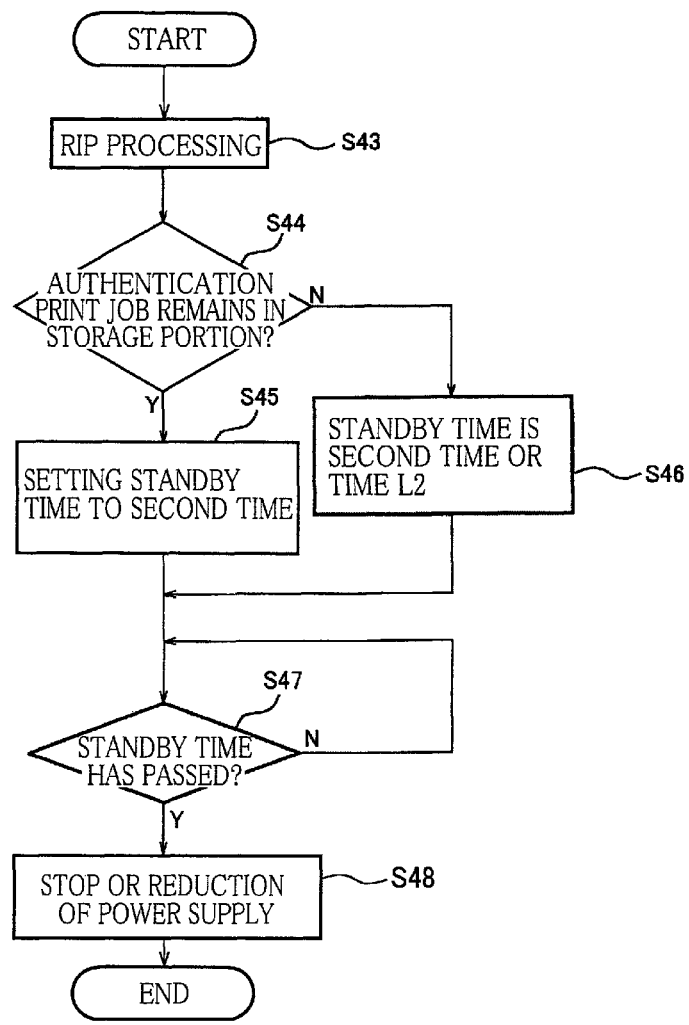
FIG. 5 is a flow chart showing a processing executed after the sleep mode is entered.

There will be next explained a sleep-mode setting processing of the image forming apparatus 2 as the present embodiment with reference to a flow chart in FIG. 3. It is noted that a processing shown in the flow chart in FIG. 3 is started when the receiver portion 21 receives the print job from the data processor 5 in the state in which the image forming apparatus 2 is in the sleep mode. This processing is for controlling the image forming apparatus 2 to enter the sleep mode but is not executed if the flow chart shown in FIG. 5 is executed. It is further noted that the sleep mode is a state in which no electric power is supplied to at least one of the printing portion 30, the storage portion 32, and the image processing section 31 of the image forming apparatus 2, while a power supply mode of the image forming apparatus 2 is a state in which the electric power is supplied to at least the printing portion 30, the storage portion 32, and the image processing section 31. When the sleep mode is exited, the image forming apparatus 2 enters the power supply mode, while, when the power supply mode is exited, the image forming apparatus 2 enters the sleep mode. Further, the processing in this flow chart is started when the receiver portion 21 receives the print job from the data processors 5 in the state in which the image forming apparatus 2 is in the power supply mode, and is ended after the image forming apparatus 2 enters the sleep mode. Further, at the start of this flow chart, the power source 23 supplies the electric power to the components of the image forming apparatus 2. If the image forming apparatus 2 is in the sleep mode when the receiver portion 21 receives the print job, the power source 23 restarts the supply of the electric power to at least the printing portion 30, the storage portion 32, and the image processing section 31 of the image forming apparatus 2. On the other hand, if the image forming apparatus 2 is in the power supply mode when the receiver portion 21 receives the print job, the power source 23 continues the supply of the electric power to the printing portion 30, the storage portion 32, and the image processing section 31 of the image forming apparatus 2. These operations are also performed in embodiments and modifications explained below.

As shown in FIG. 3, when the receiver portion 21 receives the print job from the data processor 5, the job judging section 33 reads the header of the print job. The controller 3 starts to measure time using the timer function. In S1, the job judging section 33 judges whether the print job is the storage print job. When the job judging section 33 judges that the print job is the storage print job (S1: YES), the controller 3 in S2 stores the print job into the storage portion 32. In this step, the controller 3 may develop or form an image by the RIP processing for the print job and then store the image into the storage portion 32. On the other hand, when the job judging section 33 judges that the print job is not the storage print job, that is, judges that the print job is the normal print job (S1: NO), the controller 3 in S6 controls the image processing section 31 to perform the RIP processing for the print job and then controls the printing portion 30 to print the produced image. The controller 3 starts to measure time using the timer function at the completion of the printing of the print job.

After S2, the controller 3 in S3 sets the standby time to the time L1 and then in S4 judges whether the user has entered the print command for printing the storage print job, i.e., the authentication information into the input portion 24. When the controller 3 judges that the print command has been entered (S4: YES), the storage print job in S7 is subjected to the RIP processing and printed. When the controller 3 judges that the print command has not been entered (S4: NO), the controller 3 judges in S5 whether a length of time for which the print command has not been inputted has exceeded the time L1. In other words, the controller 3 judges whether the time L1 has passed from the receipt of the storage print job without the input of the print command. When the controller 3 judges that the length of time for which the print command has not been inputted has exceeded the time L1 (S5: YES), the controller 3 in S11 controls the power source 23 to stop or reduce the supply of the electric power to the printing portion 30, the storage portion 32, and the image processing section 31 such that the image forming apparatus 2 enters the sleep mode.

On the other hand, when the job judging section 33 judges that the print job is the normal print job (S1: NO), the controller 3 after the printing in S6 judges in S8 whether the receiver portion 21 has received a next print job. When the controller 3 judges that the receiver portion 21 has received the print job (S8: YES), the flow returns to S1 in which the job judging section 33 judges the type of the print job. When the receiver portion 21 has not received the print job (S8: NO), the controller 3 in S9 sets the standby time to the time L2 and in S10 judges whether a length of time for which the print job has not been received has exceeded the time L2.

When the controller 3 judges that the length of time for which the print job has not been received has exceeded the time L2 (S10: YES), the controller 3 in S11 controls the power source 23 to stop or reduce the supply of the electric power to the printing portion 30, the storage portion 32, and the image processing section 31 such that the image forming apparatus 2 enters the sleep mode. As described above, the time L1 is longer than the time L2. That is, if the print job is the storage print job, a length of time elapsed from the receipt of the print job by the receiver portion 21 to the entering into the sleep mode is longer than a length of time elapsed from the completion of the printing of the print job by the printing portion 30 to the entering into the sleep mode. That is, if the print job is the storage print job, the standby time after which the sleep mode is entered is longer than the standby time starting from the completion of the printing of the print job. Thus, the user is less frequently forced to wait until the sleep mode is exited. Further, after the printing of the print job is completed, the sleep mode is entered more speedily than in the case where the print command for printing the storage print job has not been inputted, making it possible to maintain the lower consumption of the electric power. In the above-described processing, the print job is subjected to the RIP processing and then printed in S7, but the print job having already been subjected to the RIP processing before S7 may be printed in S7.

Second Embodiment

Figure 4:
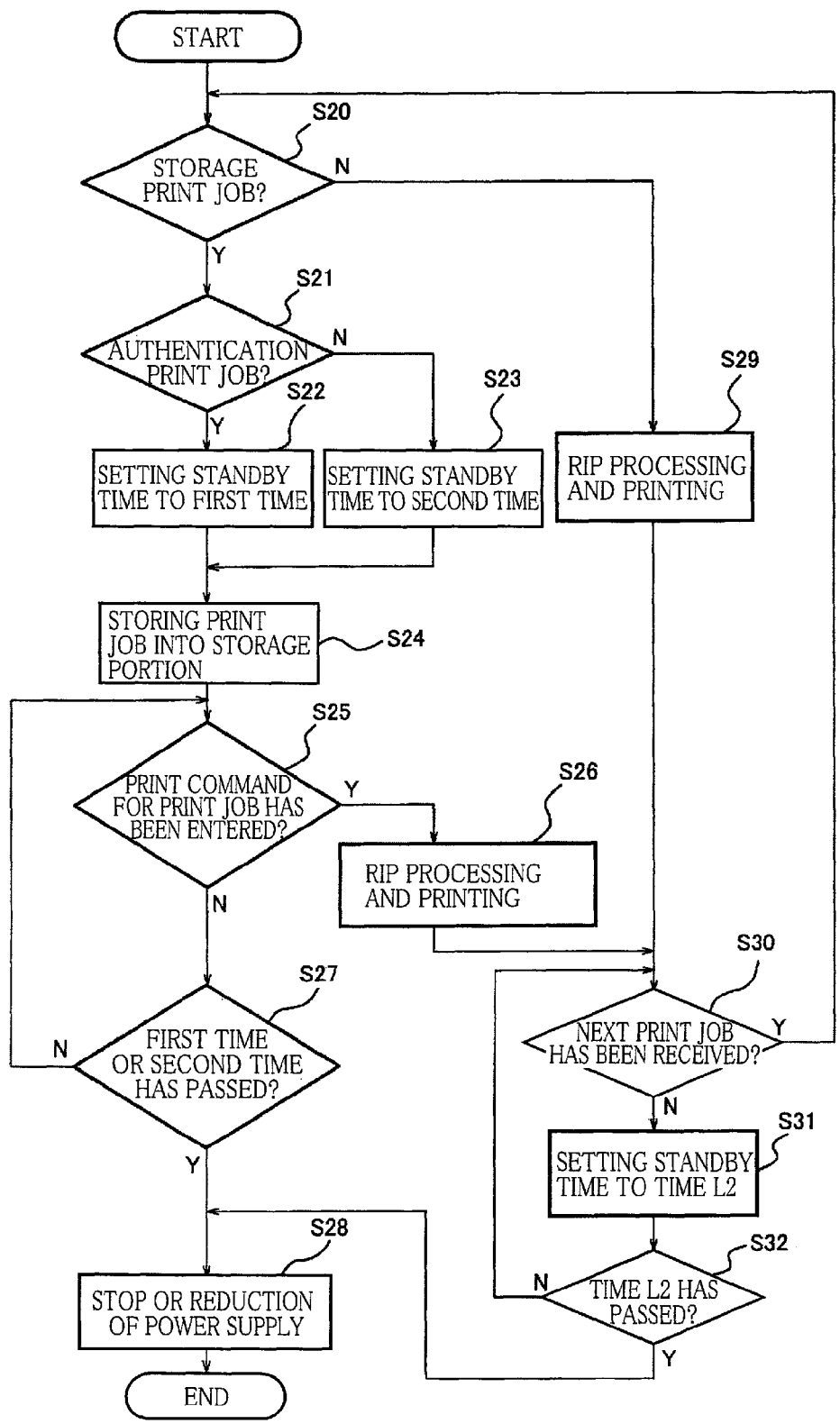
FIG. 4 is a flow chart showing a sleep-mode setting processing of an image forming apparatus as a second embodiment.

In this second embodiment, the controller 3 has two values as the standby time after which the sleep mode is entered. The values respectively correspond to a first length of time (first time) and a second length of time (second time) that is shorter than the first time. The second time is longer than the time L2, and the first time may or may not be equal to the time L1. If the print job received by the receiver portion 21 is the authentication print job, the controller 3 sets the standby time to the first time. If the print job is the non-authentication print job, the controller 3 sets the standby time to the second time. There will be explained these processings. It is noted that a processing shown in the flow chart in FIG. 4 is started when the receiver portion 21 receives the print job from the data processor 5 in the state in which the image forming apparatus 2 is in the sleep mode. This processing is for controlling the image forming apparatus 2 to enter the sleep mode but is not executed if the flow chart shown in FIG. 5 is executed. Further, the processing in this flow chart is started when the receiver portion 21 receives the print job from the data processors 5 in the state in which the image forming apparatus 2 is in the power supply mode, and is ended after the image forming apparatus 2 enters the sleep mode.

As shown in FIG. 4, when the receiver portion 21 receives the print job from the data processor 5, the job judging section 33 in S20 judges whether the print job is the storage print job. The controller 3 starts to measure time using the timer function. When the job judging section 33 judges that the print job is the storage print job (S20: YES), the job judging section 33 in S21 judges whether the print job is the authentication print job. If the print job is the authentication print job (S21: YES), the controller 3 in S22 sets the standby time to the first time. When the job judging section 33 judges that the print job is the non-authentication print job (S21: NO), the controller 3 in S23 sets the standby time to the second time. After the setting of the standby time, the controller 3 in S24 stores the storage print job into the storage portion 32.

On the other hand, when the job judging section 33 in S20 judges that the print job is not the storage print job, that is, judges that the print job is the normal print job (S20: NO), the controller 3 in S29 controls the image processing section 31 to perform the RIP processing for the print job and then controls the printing portion 30 to print the produced image. The controller 3 starts to measure time using the timer function at the completion of the printing of the print job.

After S24, the controller 3 in S25 judges whether the print command for printing the storage print job has been entered into the input portion 24 by the user. When the controller 3 judges that the print command has been entered into the input portion 24 (S25: YES), the controller 3 in S26 controls the image processing section 31 to perform the RIP processing for the storage print job and then controls the printing portion 30 to print the produced image.

When the controller 3 judges that the print command for printing the storage print job has not been entered into the input portion 24 by the user (S25: NO), the controller 3 in S27 judges whether the first time or the second time has passed from the receipt of the print job by the receiver portion 21. When the controller 3 judges that the first time or the second time has passed (S27: YES), the controller 3 in S28 controls the power source 23 to stop or reduce the supply of the electric power to the printing portion 30, the storage portion 32, and the image processing section 31 such that the image forming apparatus 2 enters the sleep mode.

On the other hand, when the job judging section 33 judges that the print job is the normal print job (S20: NO), the controller 3 after the printing of the normal print job in S29 judges in S30 whether the receiver portion 21 has received a next print job. When the controller 3 judges that the receiver portion 21 has received the print job (S30: YES), the flow returns to S20 in which the job judging section 33 judges the type of the print job. When the receiver portion 21 has not received the print job (S30: NO), the controller 3 in S31 sets the standby time to the time L2 and in S32 judges whether the length of time for which the print job has not been received has exceeded the time L2. When the controller 3 judges that the length of time for which the print job has not been received has exceeded the time L2 (S32: YES), the controller 3 in S28 controls the power source 23 to stop or reduce the supply of the electric power to the printing portion 30, the storage portion 32, and the image processing section 31 such that the image forming apparatus 2 enters the sleep mode. It is noted that when the receiver portion 21 receives the non-authentication print job in the sleep mode, the controller 3 controls the image forming apparatus 2 to exit the sleep mode to print the non-authentication print job. In general, the user wants to print the authentication print job more speedily than the non-authentication print job. Thus, if the print job is the authentication print job, the length of time after which the sleep mode is entered is made relatively long, assuring that the user is less frequently forced to wait until the sleep mode is exited. This improves the usability of the image forming apparatus for the user.

Modification of Second Embodiment

In the second embodiment, if the print job is the authentication print job (S21: YES), the controller 3 in S22 sets the standby time to the first time. As described above, the header of the authentication print job contains the user identification information. When judging the type of the print job, the job judging section 33 reads the identification information from the header using the user judging section 34 and transmits the read identification information to the controller 3. The controller 3 may set the first time for each user based on the identification information. After identifying the user associated with the authentication print job based on the identification information, the controller 3 reads the print history of the user from the print-history storage portion 25. The controller 3 may then obtain an average time taken from the receipt of the authentication print job by the receiver portion 21 to the input of the print command for each user to set the first time for each user based on the average time. A length of time from the sending of the print job by the user to the input of the print command into the image forming apparatus 2 by the user varies with a distance between the data processor 5 used by the user and the image forming apparatus 2, for example. However, an appropriate standby time can be set for each user in the present modification.

In the above-described processing, the print job is subjected to the RIP processing and then printed in S26. However, the print job having already been subjected to the RIP processing may be printed like the first embodiment. Further, the authentication print job is stored into the storage portion 32 in S24. Instead of this operation, the authentication print job may be stored into the storage portion 32 after being temporarily transmitted to the image processing section 31 to perform the RIP processing for the authentication print job. On the other hand, the non-authentication print job is directly stored into the storage portion 32. Since the image development is performed for the authentication print job in advance, a length of time required for the printing can be shortened. Further, the image produced by the image development generally has a relatively large amount of data. However, the non-authentication print job not printed immediately is stored without the image development in the present embodiment, enabling effective usage of a capacity of the storage portion 32. Further, when the authentication print job is not received within the standby time after the image development, the controller 3 controls the power source 23 to stop or reduce the supply of the electric power to the image processing section 31. Since power consumption of the image processing section 31 including standby power consumption thereof is relatively large in general, the entering of the sleep mode lowers the power consumption.

The print job is described using Page Description Language (PDL) such as Printer Control Language (PCL) and Post Script (PS). In general, the PCL requires a relatively short time for the image development, while the PS requires a relatively long time for the image development. Thus, only in a case where the authentication print job is described using a language such as the PS (a predetermined language for printing) which requires a relatively long time for the image development, the authentication print job may be stored into the storage portion 32 after being temporarily transmitted to the image processing section 31 to perform the RIP processing for the authentication print job. This operation can also shorten the length of time required for the printing. It is noted that the language used for the print job is identified in S20 by the job judging section 33.

<After Sleep Mode is Entered>

Here, a case is considered where, in the above-described processing, the first print job is the authentication print job, and the sleep mode is entered after the controller 3 sets the standby time to the first time, and thereafter the print command is not entered. This case may be a case where the user has no intention of entering the print command for some time. In such a case, the standby time does not need to be set to a relatively long time. Thus, in such a case, a processing shown in a flow chart in FIG. 5 is executed. It is noted that a processing shown in the flow chart in FIG. 5 is executed when the print job is received in the state in which the image forming apparatus 2 is in the sleep mode in the case where the image forming apparatus 2 enters the sleep mode after the controller 3 of the image forming apparatus 2 sets the standby time to the first time. It is noted that the standby time may be set to the first time according to the flow chart in FIG. 4 and may be set according to another flow chart to a first time as the standby time which is longer than the second time. When the receiver portion 21 receives the normal print job, the controller 3 in S43 supplies the electric power to the image processing section 31 and controls the image processing section 31 to perform the RIP processing for the image development. If the print job is the normal print job, the controller 3 energizes the printing portion 30 to print the normal print job. That is, the controller 3 controls the power source 23 to restart the supply of the electric power to at least the image processing section 31.

When the authentication print job having not been printed yet remains in the storage portion 32 at this time (S44: YES), the user may have no intention of entering the print command for some time. Thus, in S45, the controller 3 changes the standby time from the first time to the second time. When the standby time has passed (S47: YES), the controller 3 in S48 controls the power source 23 to stop or reduce the supply of the electric power to the printing portion 30, the storage portion 32, and the image processing section 31. When no authentication print job is stored in the storage portion 32 in S44 (S44: NO), the standby time is the second time set in S23 or the time L2 set in S31 (S46). When the standby time has passed (S47: YES), the controller 3 in S48 controls the power source 23 to stop or reduce the supply of the electric power to the printing portion 30, the storage portion 32, and the image processing section 31. In this processing, the controller 3 in S45 changes the standby time from the first time to the second time that is equal to the standby time for the storage print not having the identification printing. Thus, the standby time can be made not so long, making it possible to improve the power saving effect.

<Exit of Sleep Mode>

Figure 6:
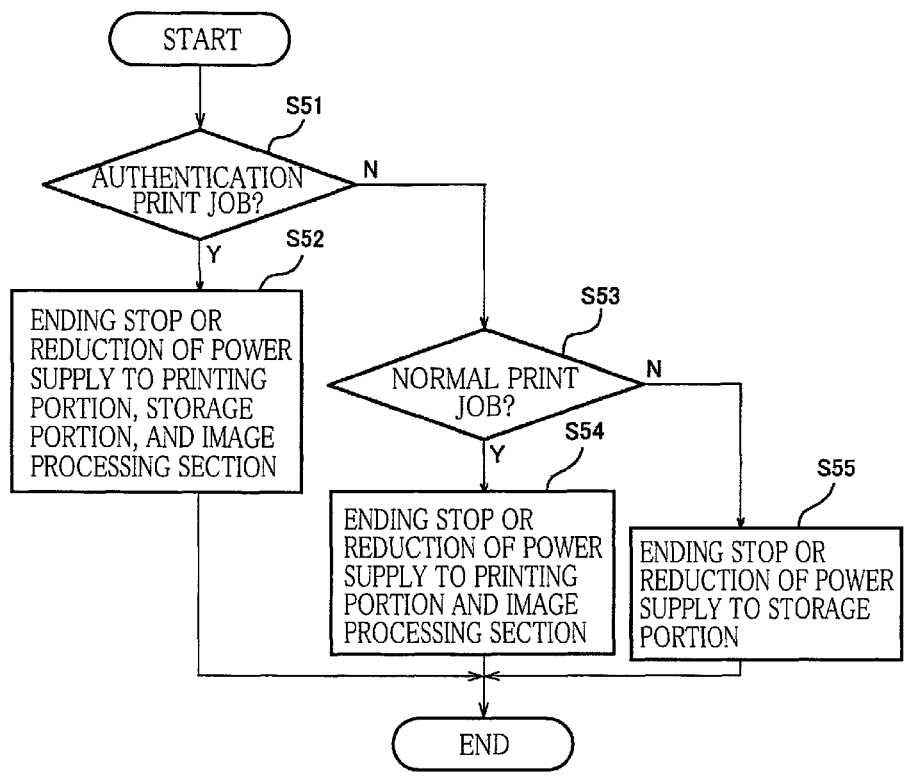
FIG. 6 is a flow chart showing a processing executed when the sleep mode is exited.

As described above, in the sleep mode, the controller 3 controls the power source 23 to stop or reduce the supply of the electric power to the printing portion 30, the storage portion 32, and the image processing section 31. When the receiver portion 21 receives a new print job in the sleep mode, the controller 3 controls the power source 23 to release or end the stop or reduction of the supply of the electric power to one or more components of the image forming apparatus 2, that is, the power source 23 supplies the electric power to the one or more components. There will be next explained a processing for exiting the sleep mode with reference to a flow chart in FIG. 6. It is noted that the processing shown in the flow chart in FIG. 6 is started when the receiver portion 21 of the image forming apparatus 2 receives the print job in the state in which the image forming apparatus 2 is in the sleep mode.

When the receiver portion 21 receives the print job in the sleep mode, the controller 3 in S51 controls the job judging section 33 to judge the type of the print job. When the job judging section 33 judges that the print job is the authentication print job (S51: YES), the controller 3 in S52 controls the power source 23 to end or finish the stop or reduction of the supply of the electric power to the printing portion 30, the storage portion 32, and the image processing section 31. If the print job is the normal print job (S51: NO, S53: YES), the controller 3 in S54 controls the power source 23 to end the stop or reduction of the supply of the electric power to the printing portion 30 and the image processing section 31 and controls the power source 23 to continue the stop or reduction of the supply of the electric power to the storage portion 32. If the print job is the storage print job other than the authentication print job (S53: NO), the controller 3 in S55 controls the power source 23 to end the stop or reduction of the supply of the electric power to the storage portion 32 and controls the power source 23 to continue the stop or reduction of the supply of the electric power to the printing portion 30 and the image processing section 31.

If the print job is the authentication print job, the job may be immediately printed without waiting for the print command of the user. Thus, the controller 3 controls the power source 23 to end the stop or reduction of the supply of the electric power to all the printing portion 30, the storage portion 32, and the image processing section 31. If the print job is the normal print job, the normal print job is immediately printed without waiting for the print command of the user. Thus, the job does not need to be stored into the storage portion 32, and the controller 3 controls the power source 23 to continue the stop or reduction of the supply of the electric power to the storage portion 32. If the print job is the storage print job other than the authentication print job, namely, the print job for the public print or the private print, the job is less likely to be printed immediately than the authentication print job. Thus, the controller 3 controls the power source 23 to end the stop or reduction of the supply of the electric power to the storage portion 32, and the storage print job is stored into the storage portion 32. In this processing, components for which the stop or reduction of the supply of the electric power is ended are different from each other depending upon the type of the received print job, making it possible to lower the power consumption of the image forming apparatus 2.

Third Embodiment

As described above, in general, the user wants to print the authentication print job speedily, but the user less frequently wants to print the normal print job speedily. Thus, in a case where the standby time from the receipt of the authentication print job by the receiver portion 21 to the entering of the sleep mode is set to a relatively long time, the user is less frequently forced to wait until the sleep mode is exited. However, there is no need to set the standby time to a relatively long time in a case where the user has not inputted the print command for a long time since the authentication print job had been received by the receiver portion 21. The present third embodiment is for solving this problem and will be explained with reference to FIGS. 7, 8, and 9.

Figure 7:
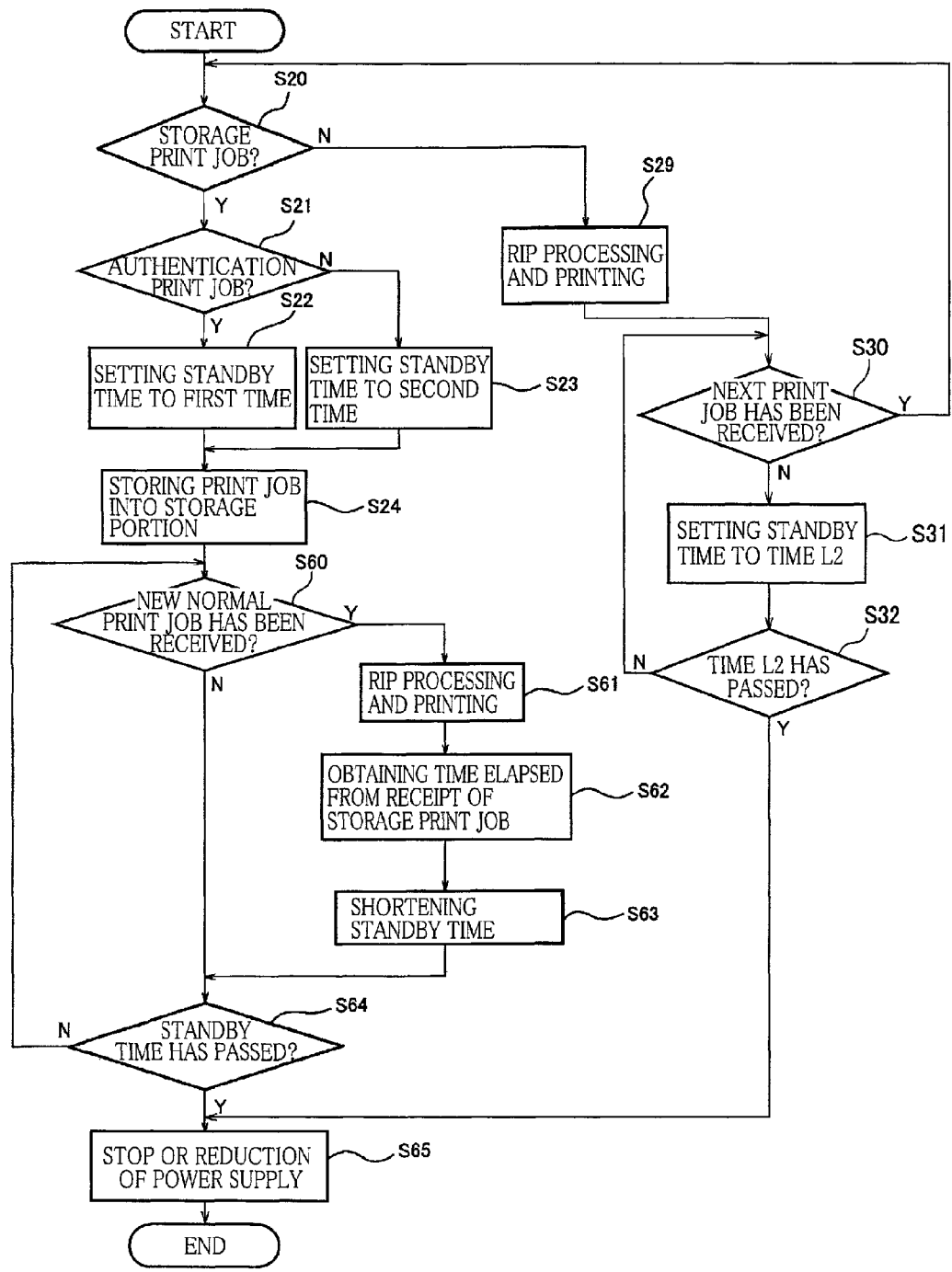
FIG. 7 is a flow chart showing a processing in a third embodiment.

In the present embodiment, it is assumed that the first time as the value of the standby time is 40 seconds, the second time as the value of the standby time is 30 seconds, and the time L2 as the value of the standby time set after the printing of the normal print job is 15 seconds. In the processing in FIG. 7, processings in S20-S24 are the same as the processings in S20-S24 in FIG. 4 in which the standby time is set to the first time or the second time depending upon whether the print job is the authentication print job or the non-authentication print job after the receiver portion 21 receives the print job. Thus, the following explanation starts from a processing in S24 in FIG. 4, assuming that the received storage print job is the authentication print job. Since the authentication print job has been received by the receiver portion 21, the controller 3 controls the power source 23 to stop or reduce the supply of the electric power to the printing portion 30, the storage portion 32, and the image processing section 31 after the first time, i.e., 40 seconds from the receipt of the authentication print job. It is noted that a processing shown in the flow chart in FIG. 7 is started when the receiver portion 21 receives the print job from the data processor 5 in the state in which the image forming apparatus 2 is in the sleep mode. This processing is for controlling the image forming apparatus 2 to enter the sleep mode but is not executed if the flow chart shown in FIG. 5 is executed. Further, the processing in this flow chart is started when the receiver portion 21 receives the print job from the data processors 5 in the state in which the image forming apparatus 2 is in the power supply mode, and is ended after the image forming apparatus 2 enters the sleep mode. It is further noted that the processings in S29-S32 in this flow chart are the same as those in S29-S32 in the flow chart in FIG. 4, and an explanation of which is dispensed with.

Figure 8:
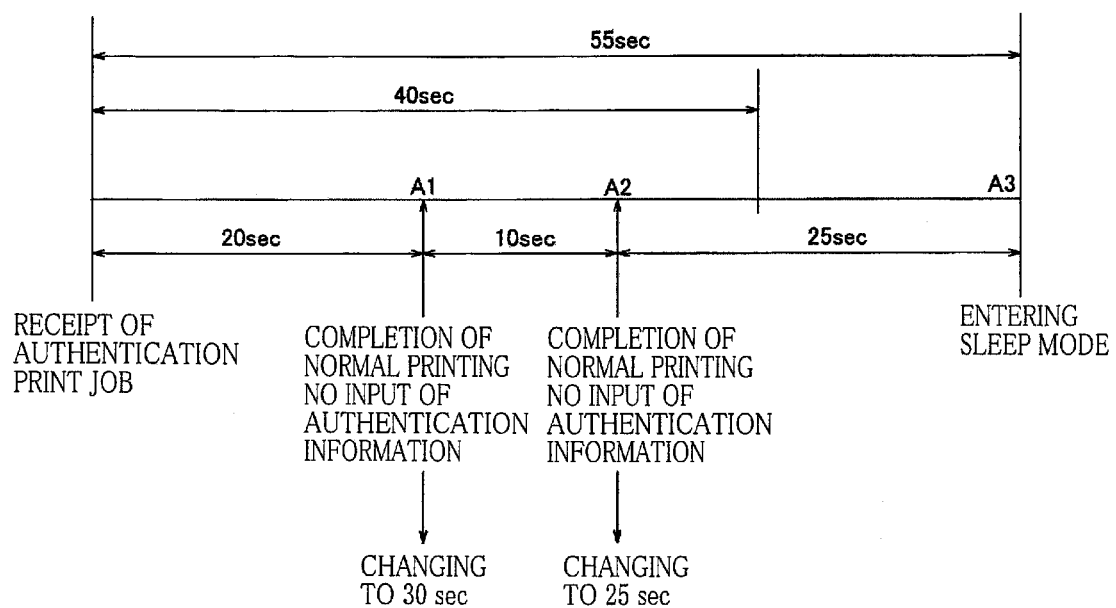
FIG. 8 is a view for explaining the processing in the third embodiment.

It is assumed that the receiver portion 21 has received a new normal print job after the authentication print job is stored into the storage portion 32 (S60: YES). In S61, the normal print job is printed immediately without waiting for the print command from the user. However, the authentication print job for which the print command, i.e., the authentication information has not been entered remains in the storage portion 32. In S62, the controller 3 uses the timer function to obtain a length of time elapsed from the receipt of the authentication print job by the receiver portion 21 to a current time. Specifically, as shown in FIG. 8, it is assumed that 20 seconds have passed at time A1 from the receipt of the authentication print job by the receiver portion 21. The print command, i.e., the authentication information has not been entered into the input portion 24 by the user. Assuming that the authentication information will not be inputted by the user for some time, the controller 3 sets the first time to a smaller value such that the first time gets nearer to the time L2. Specifically, in S63, the controller 3 sets the standby time to 30 seconds starting from the receipt of the print job by the receiver portion 21.

As shown in FIG. 8, it is assumed that 10 seconds have passed at time A2 from time A1, that is, 30 seconds have passed from the receipt of the authentication print job by the receiver portion 21. It is further assumed that the receiver portion 21 has received a normal print job (S60: YES). In S61, the normal print job is printed immediately without waiting for the print command from the user. This normal printing is completed at time A2. The authentication information has not been entered into the input portion 24 by the user. Assuming that the authentication information will not be inputted by the user for a relatively long time, the controller 3 sets the first time to a much smaller value such that the first time gets nearer to the time L2. Specifically, in S61, the controller 3 sets the standby time to 25 seconds starting from the receipt of the print job by the receiver portion 21. In view of the above, the controller 3 makes the first time or the second time become nearer to the standby time of the normal print job (the time L2) with increasing (elapsed) time from the receipt of the authentication print job by the receiver portion 21.

As indicated at time A3, when the authentication information has not been entered by the user even when 25 seconds have passed from time A2, that is, even when 55 seconds have passed from the receipt of the authentication print job by the receiver portion 21 (S64: YES), the user may have no intention of printing the authentication print job. Since the set standby time has passed from the receipt of the authentication print job, the controller 3 in S65 controls the power source 23 to stop or reduce the supply of the electric power to the printing portion 30, the storage portion 32, and the image processing section 31. It is noted that the sleep mode is entered when 55 seconds (not 40 seconds) have passed from the receipt of the authentication print job by the receiver portion 21, that is, an extra standby time is added to the standby time. This is for taking into consideration a case where the input of the authentication information is hindered by a user having commanded the normal printing during the standby time set after the receipt of the authentication print job (e.g., a case where the user having commanded the normal printing arrives at the image forming apparatus 2 to get documents printed by the normal printing).

Figure 9:
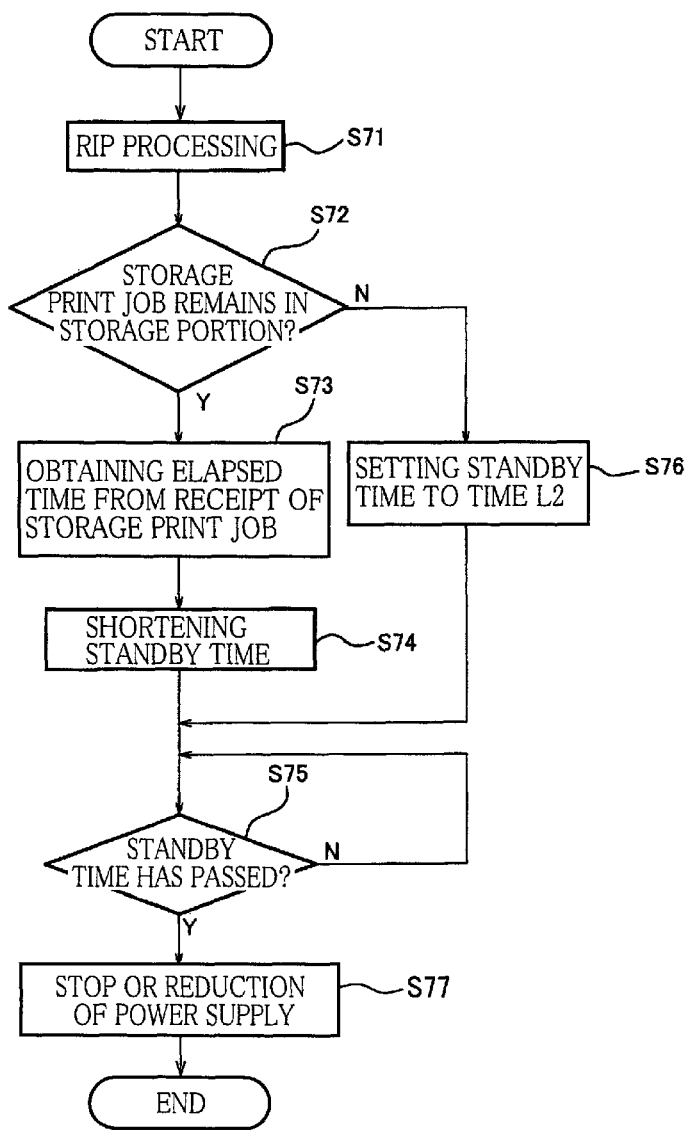
FIG. 9 is a flow chart showing a processing in the third embodiment.

The above-described processing is executed also after the sleep mode is exited. A processing shown in the flow chart in FIG. 9 is started when the receiver portion 21 receives the print job in the case where the authentication print job for which the print command, i.e., the authentication information has not been entered remains in the storage portion 32 in the state in which the image forming apparatus 2 is in the sleep mode, and this flow chart is for explaining the control for controlling the image forming apparatus 2 to enter the sleep mode. When the receiver portion 21 receives the print job in the sleep mode, the controller 3 in S71 supplies the electric power to the image processing section 31 and controls the image processing section 31 to perform the RIP processing for the image development. If the print job is the normal print job, the controller 3 energizes the printing portion 30 to print the normal print job. That is, the controller 3 controls the power source 23 to end the stop or reduction of the supply of the electric power to at least the image processing section 31.

When the storage print job having not been printed yet remains in the storage portion 32 (S72: YES), the controller 3 in S73 obtains a length of time elapsed from the receipt of the storage print job by the receiver portion 21. In S74, the controller 3 shortens the standby time after which the sleep mode is entered, depending upon the elapsed time. Then in S75, the controller 3 judges whether the standby time has passed. When the controller 3 judges that the standby time has passed without the print command for the storage print job (S75: YES), the controller 3 in S77 controls the power source 23 to stop or reduce the supply of the electric power to the printing portion 30, the storage portion 32, and the image processing section 31. When the storage portion 32 stores no storage print job in S72 (S72: NO), the controller 3 in S76 sets the standby time to the time L2 which is set after the printing of the normal print job. Then, when the controller 3 judges that the time L2 as the standby time has passed (S75: YES), the controller 3 in S77 controls the power source 23 to stop or reduce the supply of the electric power to the printing portion 30, the storage portion 32, and the image processing section 31.

As described above, in the case where the user does not command the printing of the authentication print job for a relatively long time, the user may have no intention of printing the authentication print job. In such a case, the controller 3 makes the standby time become nearer to the time L2 which is set after the printing of the normal print job, depending upon the elapsed time from the receipt of the authentication print job by the receiver portion 21, thereby improving the power saving effect. It is noted that the case where the printing command for the authentication print job is not entered for a relatively long time has been explained, but the above-described processing may be executed in a case where the print command for printing another storage print job is not entered for a relatively long time.

<At Completion of Printing or Deletion of Print Job>

The user can delete the storage print job from the storage portion 32 by entering a command for deleting the storage print job into the input portion 24 at the image forming apparatus 2 after sending the storage print job to the image forming apparatus 2. Further, there is a case where all the authentication print jobs in the storage portion 32 have been printed, and the storage portion 32 stores no authentication print jobs to be printed. In this case, the standby time after the printing is set by the controller 3 in the following manner.

In the case where the printing of the authentication print job stored in the storage portion 32 is completed, the authentication print job is deleted from the storage portion 32 as described above. Further, the print job for the public print and the private print of the non-authentication print job remains in the storage portion 32 in a case where the user does not enter the command for deleting the print job after the print job is printed. However, there is an extremely low possibility that the public print or the private print is printed again successively after the printing of the public print or the private print. Thus, even if the standby time is set at the first time or the second time, the controller 3 sets the standby time after the printing to the time L2 which is set after the normal print job, i.e., the time shorter than the second time. This lowers the power consumption. The same processing is executed also in a case where the user has deleted all the authentication print jobs and the non-authentication print jobs stored in the storage portion 32.

In a case where the storage portion 32 stores no authentication print job but stores the non-authentication print job, there is a possibility that the print command is entered for the non-authentication print job. Thus, the controller 3 sets the standby time to the second time and waits for the printing of the non-authentication print job.

<Another Embodiment of Image Forming System>

Figure 10:
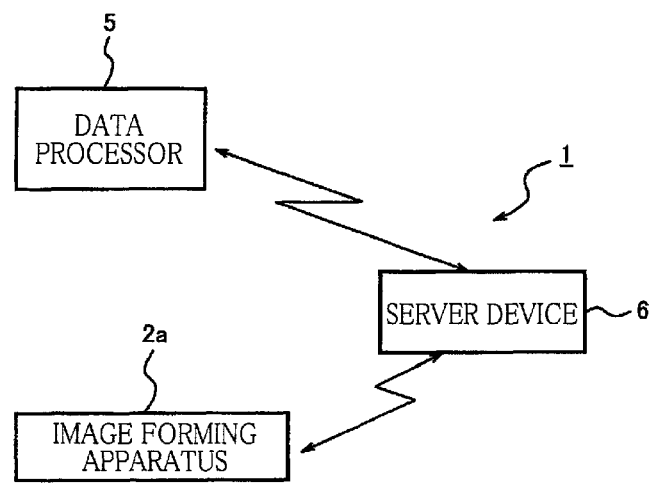
FIG. 10 is a schematic view showing an image forming system as another embodiment.

In the above-described configuration, the image forming apparatus 2 is connected to the plurality of the data processors 5 via the network 10. However, instead of this configuration, as shown in FIG. 10, an image forming apparatus 2a may be connected to the data processors 5 via a server device 6 and a network. The server device 6 can transmit the header and the print data of the print job separately to the image forming apparatus 2a. In the present embodiment, the header will be called a print command. In other words, the print job is constituted by the print command and the print data. Further, the print data of the storage print job will be called storage print data, and the print data of the normal print job will be called normal print data. Further, the image forming apparatus 2a can transmit a transfer request of the print data to the server device 6, and this transfer request is transmitted by the user entering the print command into the image forming apparatus 2a. The storage print data is stored in the server device 6 until the transfer request is outputted from the image forming apparatus 2a, while the normal print data is transmitted to the image forming apparatus 2a together with the print command without waiting for the transfer request outputted from the image forming apparatus 2a. That is, in a case where the print command and the print data are transmitted together with each other from the server device 6 to the image forming apparatus 2a, the print job of the print command and the print data is the normal print job.

Figure 11:
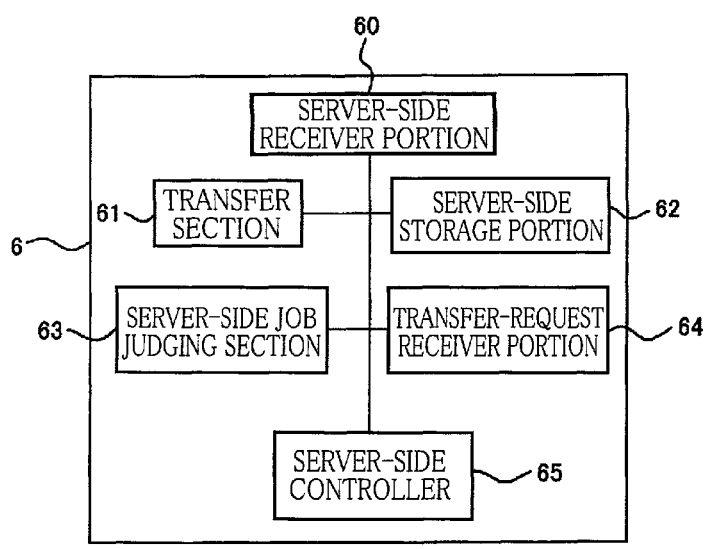
FIG. 11 is a block diagram showing a server device of the image forming system shown in FIG. 10.
Figure 12:
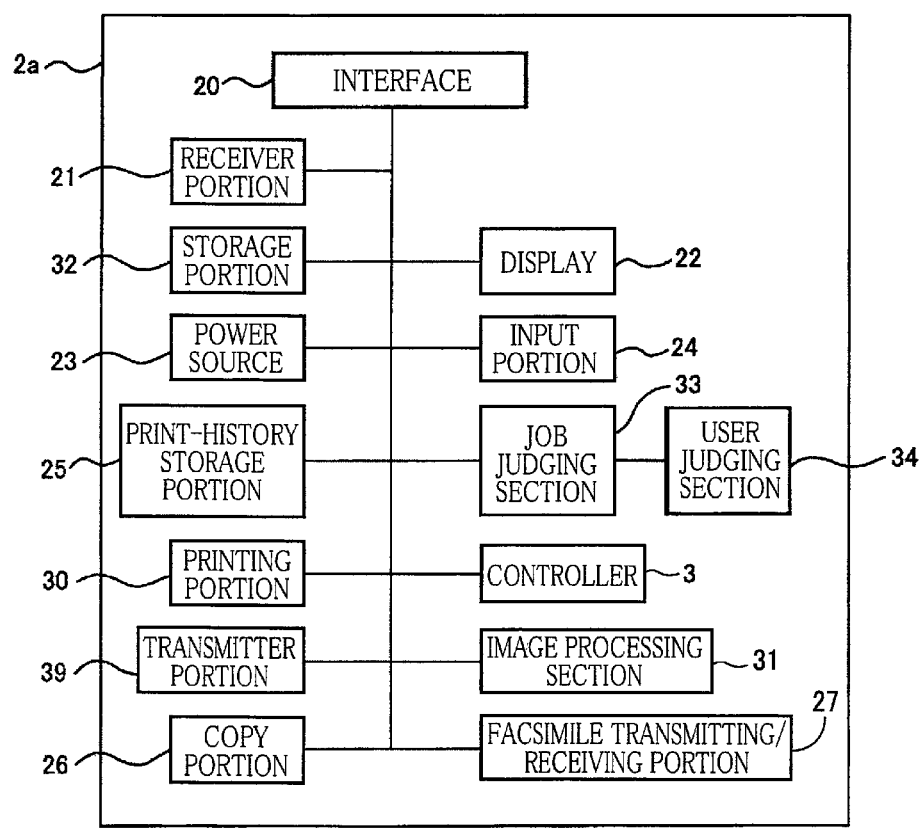
FIG. 12 is a block diagram showing a configuration of an image forming apparatus of the image forming system shown in FIG. 10.

As shown in FIG. 11, the server device 6 includes: a server-side receiver portion 60 configured to receive the print command and the print data transmitted from the data processors 5; a transfer section 61 configured to transfer, to the image forming apparatus 2a, at least one of the print command and the print data received by the server-side receiver portion 60; a server-side storage portion 62 capable of storing the print data; a server-side job judging section 63 configured to judge whether the print data received by the server-side receiver portion 60 is the storage print data or the normal print data, based on the print command; a transfer-request receiver portion 64 configured to receive the transfer request transmitted from the image forming apparatus 2a; and a server-side controller 65 configured to control the transfer section 61 and the server-side storage portion 62. In addition to the configuration shown in FIG. 1, the image forming apparatus 2a, as shown in FIG. 12, includes a transmitter portion 39 configured to transmit the transfer request of the storage print data to the server device 6. Further, the storage portion 32 can store the print command, and the user enters a command for the printing into the input portion 24.

Figure 13:
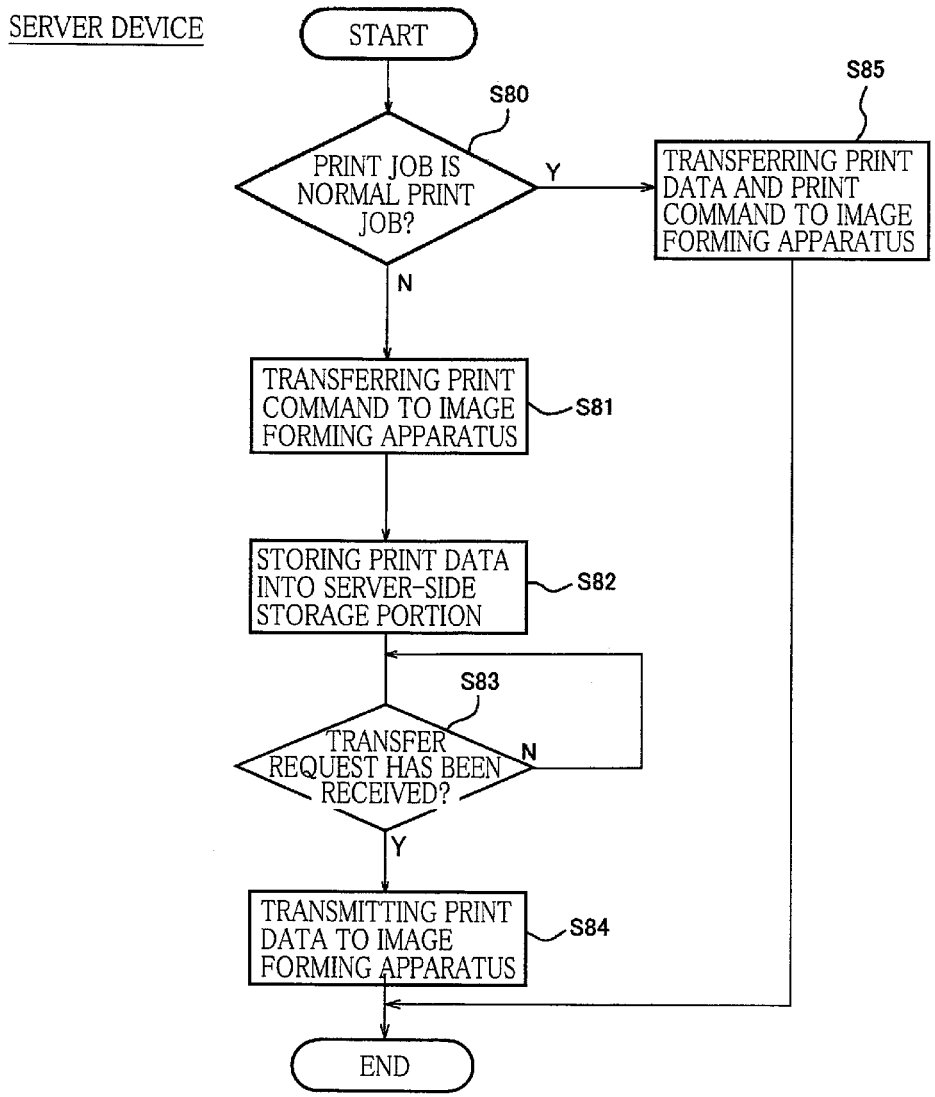
FIG. 13 is a flow chart showing a processing of the server device of the image forming system shown in FIG. 10.

There will be next explained an operation of the server device 6 with reference to FIG. 13. In S80, when the server device 6 receives the print job from the data processor 5, the server-side job judging section 33 judges whether the print job is the normal print job. When the print job is the normal print job (S80: YES), the server-side controller 3 in S85 controls the transfer section 61 to transfer the print data and the print command, i.e., the normal print job to the image forming apparatus 2a. When the print job is the storage print job (S80: NO), the transfer section 61 in S81 transfers only the print command to the image forming apparatus 2a, and the server-side controller 65 in S82 stores the print data into the server-side storage portion 62. When the transfer-request receiver portion 64 receives the transfer request transmitted from the image forming apparatus 2a (S83: YES), the transfer section 61 in S84 transmits the print data to the image forming apparatus 2a.

Figure 14:
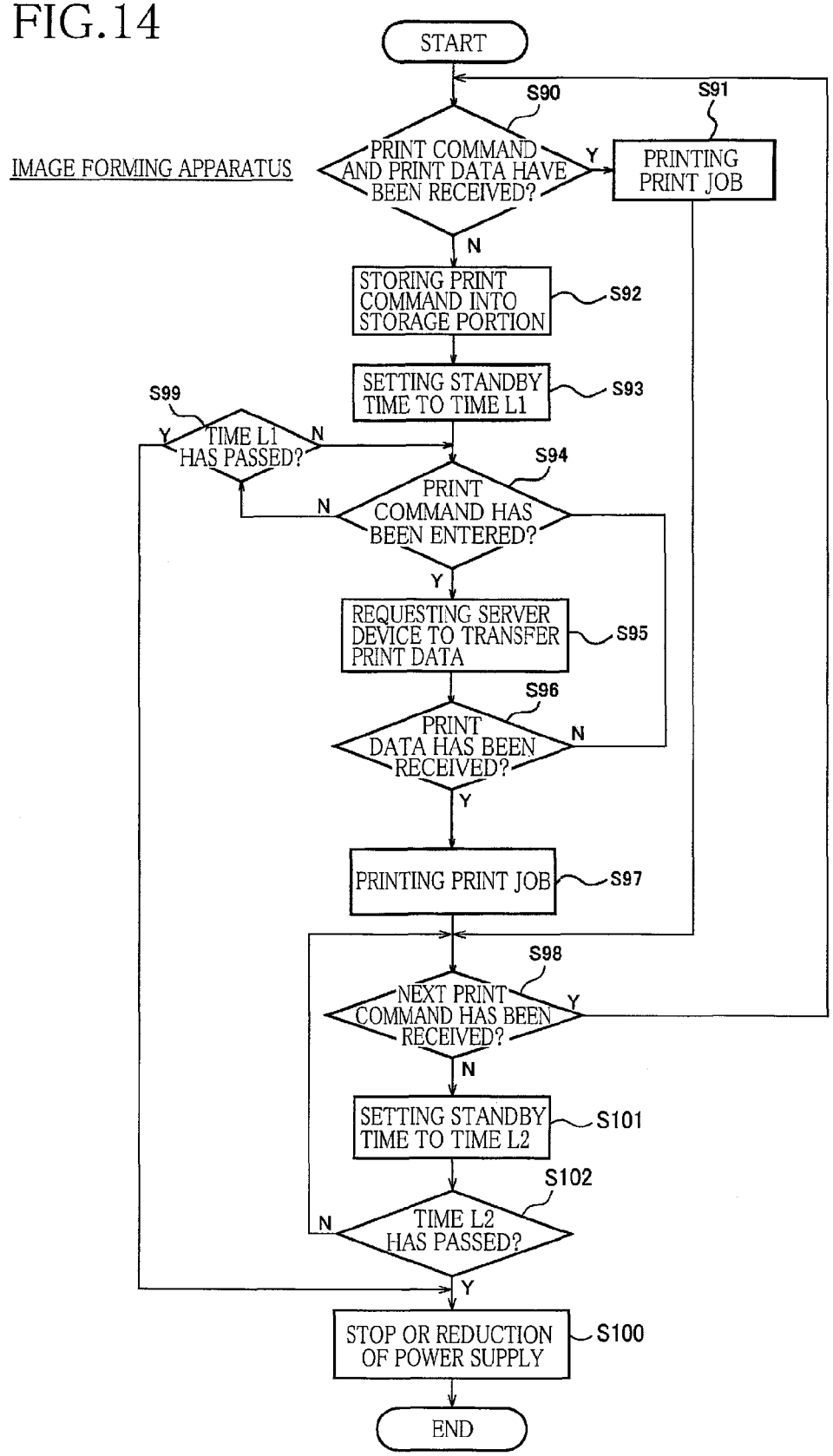
FIG. 14 is a flow chart showing a processing of the image forming apparatus of the image forming system shown in FIG. 10.

There will be next explained an operation of the image forming apparatus 2a with reference to FIG. 14. A processing shown in a flow chart in FIG. 14 is for controlling the image forming apparatus 2a to enter the sleep mode. This processing is started when the receiver portion 21 receives the print command from the server device 6, and is ended after the image forming apparatus 2a enters the sleep mode.

When the receiver portion 21 of the image forming apparatus 2a receives the print job, i.e., the print command and the print data from the server device 6 (S90: YES), this print job is the normal print job. Thus, in S91, the print job is printed immediately without waiting for the print command from the user. The controller 3 starts to measure time using the timer function at the completion of the printing of the print job. When the receiver portion 21 receives only the print command (S90: NO), this print command is the print command for printing the storage print job. Thus, in S92, the controller 3 uses the timer function to start to measure time at the receipt of the print command and stores the print command into the storage portion 32. Then in S93, the controller 3 sets the standby time to the time L1.

When the user inputs the print command into the input portion 24 (S94: YES), the transmitter portion 39 in S95 requests the server device 6 to transfer the print data. When the print command has not been inputted into the input portion 24 (S94: NO), the controller 3 in S99 judges whether the time L1 has passed from the receipt of the print command. When the print command has not been inputted within the time L1 (S99: YES), the controller 3 in S100 controls the power source 23 to stop or reduce the supply of the electric power to the printing portion 30, the storage portion 32, and the image processing section 31. When the print command has been inputted within the time L1 from the receipt of the print command (S99: NO, S94: YES), the controller 3 in S95 requests the transfer of the print data.

When the receiver portion 21 receives the print data from the server device 6 (S96: YES), the controller 3 in S97 controls the printing portion 30 to print the print job constituted by the print command and the print data stored in the storage portion 32. The controller 3 starts to measure time using the timer function at the completion of the printing of the print job. When the receiver portion 21 receives a next print command after the completion of the printing (S98: YES), the flow goes to S90 in which the controller 3 judges whether the print command and the print data have been received. On the other hand, when the receiver portion 21 has not received the next print command (S98: NO), the controller 3 in S101 sets the standby time to the time L2 that is shorter than the time L1.

When the time L2 has passed from the completion of the printing of the print job without the receipt of the next print command by the receiver portion 21 (S102: YES), the controller 3 in S100 controls the power source 23 to stop or reduce the supply of the electric power to the printing portion 30, the storage portion 32, and the image processing section 31.

Also in the image forming system as the present embodiment, if the print job is the storage print job, the standby time after which the sleep mode is entered is made longer. Thus, the user is less frequently forced to wait until the sleep mode is exited. Further, after the printing of the print job is completed, the sleep mode is entered more speedily than in the case where the print command for printing the storage print job has not been inputted, making it possible to maintain the lower consumption of the electric power.

The numbers used in the third embodiment are not limited to those used in the above explanation. For example, the above-described numbers of the first time, the second time, and the time L2 are merely examples, and other appropriate values may be used.

The printing portion 30 may be a printing device of a laser printer or a printing device of an ink-jet printer. Further, the image forming apparatus 2 is not limited to the multifunction printer. That is, the image forming apparatus 2 may be an ink jet printer or a laser printer having no copy or facsimile function.

In the above-described embodiments, the authentication print job is automatically deleted from the image forming apparatus 2 after the printing, but the image forming apparatus 2 may be configured so as to allow the user to select deleting or keeping of the authentication print job from or in the image forming apparatus 2 when the user enters the print command for the print job. Likewise, the image forming apparatus 2 may be configured so as to allow the user to select deleting or keeping of the print job for the public print and the private print from or in the image forming apparatus 2 when the user enters the print command for the print job.

Further, in the above-described embodiment, the controller 3 changes the standby time from the first time to the second time in S45 in FIG. 5, but this second time may not be equal to the standby time which is set for the storage print job other than the authentication print job. That is, the second time only needs to be a time between the first time and the time L2.

In the above-described embodiments, the controller 3 may be constituted by a single CPU. Alternatively, the controller 3 may be constituted by a plurality of CPUs, an application-specific integrated circuit (ASIC), or a combination of the CPU(s) and the ASIC.

What is claimed is:
1. An image forming apparatus comprising:
a receiver configured to receive a print job transmitted from an external device;
a printing unit configured to print an image on a print medium based on the print job;
a storage unit configured to store one of the print job and image data associated with the print job;
an input interface configured to receive a print execution command for commanding an execution of the printing of the print job stored in the storage unit;
a power source controlled by a processor and configured to supply an electric power to at least the printing unit; and
the processor configured to:
judge whether the print job received by the receiver is a print-execution-command-input required print job based on which the printing unit performs printing on condition that the print execution command is inputted into the input interface or a print-execution-command-input unrequired print job based on which the printing unit performs printing without waiting for the input of the print execution command into the input interface;
control the power source to stop or reduce the supply of the electric power to the printing unit when the receiver has not received a next print job within an after-printing standby time elapsed from the completion of the printing by the printing unit for the print job received by the receiver; and
control the power source to stop or reduce the supply of the electric power to the printing unit when the print job received by the receiver is the print-execution-command-input required print job and the receiver has not received a next print job within an after-print-job-receipt standby time elapsed from a time of the receipt of the print-execution-command-input required print job by the receiver, the after-print-job-receipt standby time being longer than the after-printing standby time,
wherein the processor is configured to judge whether the print-execution-command-input required print job is an authentication print job that requires an input of the authentication information into the input interface by a user to perform the printing or a non-authentication print job that does not require the input of the authentication information into the input interface by the user to perform printing, wherein, when the processor judges the print job received by the receiver as the authentication print job, the processor sets the after-print-job-receipt standby time to a first time, and when the processor judges the print job received by the receiver as the non-authentication print job, the processor sets the after-print-job-receipt standby time to a second time that is shorter than the first time, wherein, when printing for all the authentication print jobs stored in the storage unit is completed, or all of the authentication print jobs for which the printing has not been performed are deleted from the storage unit, and when printing for all the non-authentication print jobs stored in the storage unit is completed, or all of the non-authentication print jobs for which the printing has not been performed are deleted from the storage unit, the processor sets each of the first time and the second time to a length of time that is equal to the after-printing standby time for the print-execution-command-input unrequired print job, and wherein, when printing for all the authentication print jobs stored in the storage unit is completed, or all of the authentication print jobs for which the printing has not been performed are deleted from the storage unit, and when printing for all the non-authentication print jobs stored in the storage unit is not completed, or all of the non-authentication print jobs for which the printing has not been performed are not deleted from the storage unit, the processor sets the first time to a length of time that is equal to the second time.

2. An image forming system comprising: a data processor; a server device capable of receiving a print command and print data transmitted from the data processor; an image forming apparatus capable of receiving the print command and the print data transferred from the server device, wherein the server device comprises:

a server-side receiver configured to receive the print command and the print data transmitted from the data processor;

a transfer unit controlled by a server-side processor and configured to transfer, to the image forming apparatus, at least one of the print command and the print data received by the server-side receiver;

a server-side storage unit configured to store at least the print data;

a transfer-request receiver configured to receive a transfer request of the print data transmitted from the image forming apparatus;

the server-side processor configured to:

judge whether the print data received by the server-side receiver is transfer-request required print data for transferring the print data to the image forming apparatus when the transfer request is transmitted from the image forming apparatus or transfer-request unrequired print data for transferring the print data to the image forming apparatus without waiting for the transfer request transmitted from the image forming apparatus;

control the transfer unit to transfer the print command and the print data to the image forming apparatus when the print data received by the server-side receiver is the transfer-request unrequired print data;

when the print data received by the server-side receiver is the transfer-request required print data, control the transfer unit to transfer the print command to the image forming apparatus and control the server-side storage unit to store the print data into the server-side storage unit; and thereafter control the transfer unit to transfer the print data to the image forming apparatus when the transfer-request receiver receives a transfer request for the print data stored in the server-side storage unit, and wherein the image forming apparatus comprises:

a receiver configured to receive the print command and the print data transferred from the server device;

a transmitter configured to transmit the transfer request to the server device;

a printing unit configured to print an image on a print medium based on the print data; a storage unit configured to store the print command;

an input interface configured to receive a print execution command for commanding an execution of the print command stored in the storage unit;

a power source configured to supply an electric power to at least the printing unit; and a processor configured to:

when the receiver receives the print command and the print data, control the printing unit to print the image on the print medium based on the print data without waiting for the input of the print execution command into the input interface;

when the print command is received without the receipt of the print data by the receiver, store the received print command into the storage unit, control the transmitter to request the server device to transfer the print data corresponding to the print command when the print execution command for executing the print command stored in the storage unit is inputted into the input interface, and control the printing unit to print the image based on the print data after the receiver receives the print data transferred from the transfer unit in response to the transfer request; and control the power source to stop or reduce the supply of the electric power to the printing unit when the receiver has not received a next print command within an after-printing standby time elapsed from completion of the printing by the printing unit for the print data received by the receiver, and control the power source to stop or reduce the supply of the electric power to the printing unit when the receiver has not received a next print command within an after-print-command-receipt standby time elapsed from a time of the receipt of the print command by the receiver, the after-print-command-receipt standby time being longer than the after-printing standby time.

* * * * *